United States Patent [19]

Moore

[11] 3,902,358
[45] Sept. 2, 1975

[54] APPARATUS FOR EVALUATING AND TESTING THE SHARPNESS OF POINTS

[75] Inventor: John D. Moore, Rockville, Md.

[73] Assignee: The United States of America as represented by the Secretary of the Department of Health, Education and Welfare, Washington, D.C.

[22] Filed: May 6, 1974

[21] Appl. No.: 467,506

[52] U.S. Cl. ................................................ 73/104
[51] Int. Cl. .......................................... G01n 19/00
[58] Field of Search ................... 73/78, 81, 87, 104

[56] References Cited
UNITED STATES PATENTS
2,699,540  1/1955  Hunter .............................. 73/81 X
3,418,855  12/1968  Apat ................................ 73/104 X Primary Examiner—Richard E. Aegerter
Assistant Examiner—Charles E. Phillips

[57] ABSTRACT

An instrument for testing the degree of sharpness of points by evaluating the depth to width ratio of the point and the strength or rigidity of the material of the point being tested comprises a disc having a slot through which the point may be inserted and a sensing head for sensing the depth of penetration of the point through the slot. The device also includes a micrometer scale and spindle for advancing the sensing head toward the point and measuring the depth of penetration of the point from the slot to the sensing head. A light in the sensing head indicates when it is contacted by the test point.

15 Claims, 6 Drawing Figures

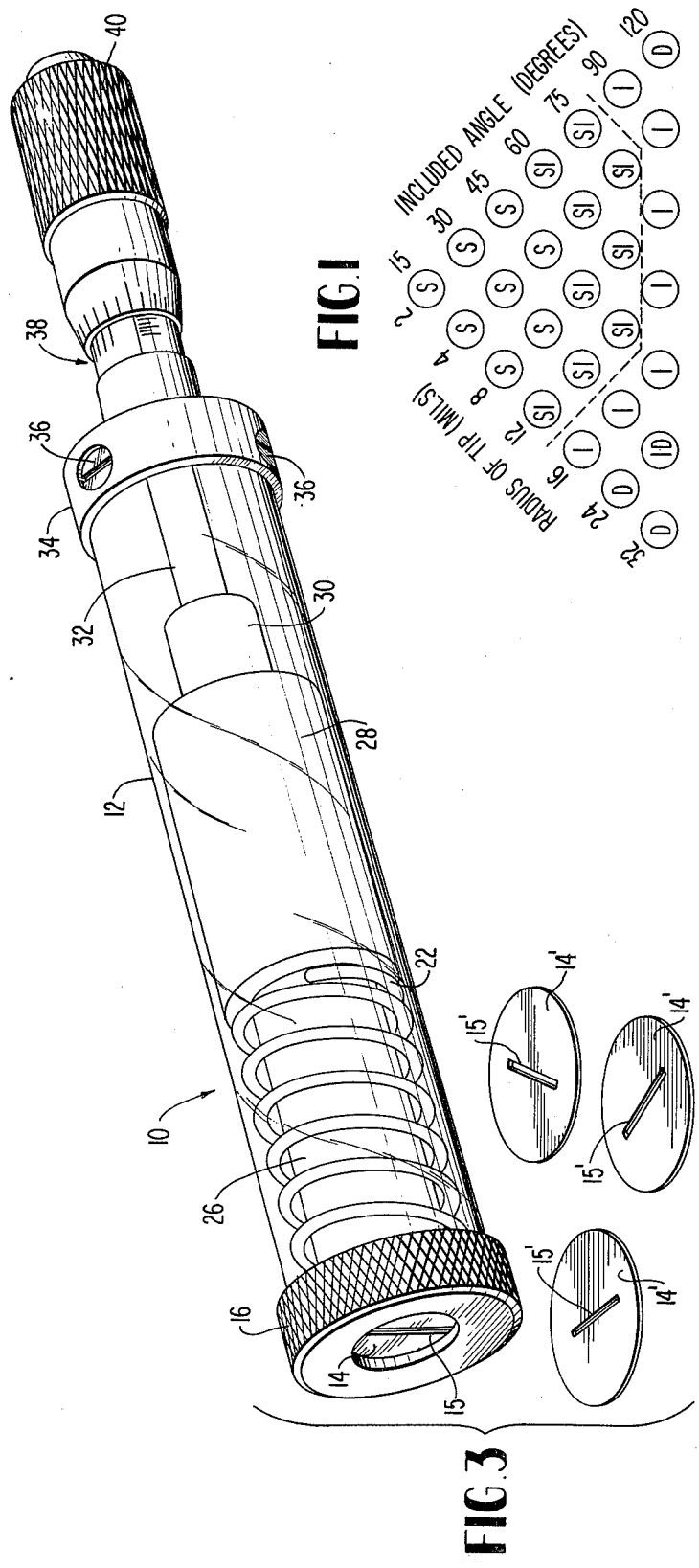
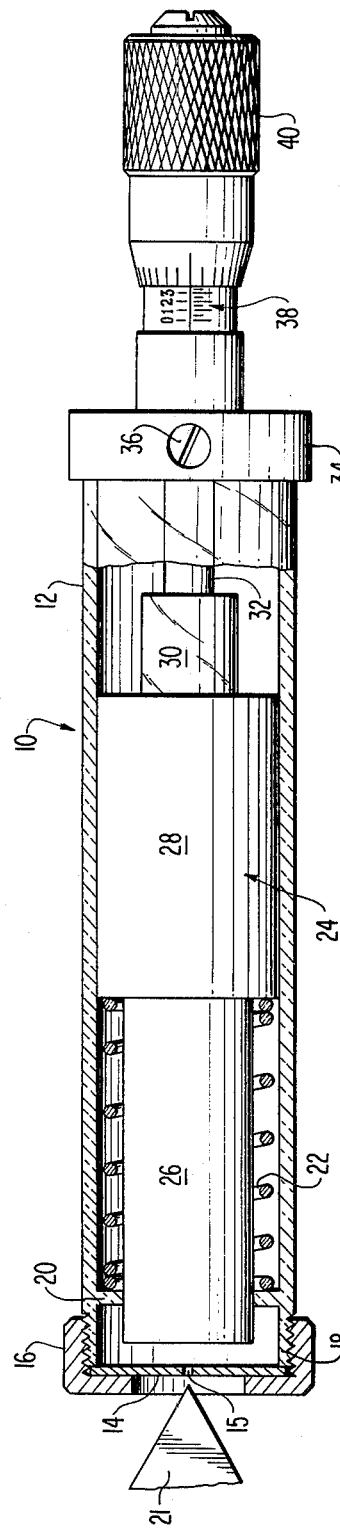

3,902,358

APPARATUS FOR EVALUATING AND TESTING THE SHARPNESS OF POINTS

FIELD OF THE INVENTION

The present invention relates to the testing of point sharpness, and more pertinently, to a pocket-sized point sharpness tester which automatically measures the depth to width ratio of a test point and signals the user if the sharpness of the point is greater than a predetermined ratio.

BACKGROUND OF THE INVENTION

Sharp points, capable of producing injury, are frequently found on consumer products in areas accessible to casual contact. Casual contact may be defined as the contact that a child would make with the toy during unpacking, assembling, operating, or in any other way playing with or handling the product as opposed to falling on or being struck by it. Of particular concern is the presence of sharp points on toys, which may be the result of poor design, poor quality control, or damage to the toy due to reasonably forseeable use by children at play.

In accordance with the known procedures for determining the sharpness of a point, the point is visually examined (for example, by microscope) or physically examined (for example, by touch) and its contour is noted. The major drawback of such subjective prior art procedures is the lack of uniformity and reproducibility of the test results.

Although a system for automatically testing the sharpness of needles is disclosed in U.S. Pat. No. 3,418,855, it utilizes complicated electrical and mechanical components to measure and record the sharpness of the needle. Thus, a major problem with this device, besides its complexity, is its bulk and size which seriously limit the adaptation of the device to portable usage.

SUMMARY OF THE INVENTION

A principle object of the present invention is to overcome the defects of the prior art procedures and systems for testing the sharpness of points, such as indicated above.

Another object of the present invention is to provide for improved point sharpness testing; and to provide an improved automatic point sharpness tester.

Another object is to define hazardous sharp points and, on the basis of this definition, develop a test instrument which differentiates hazardous sharp points from nonhazardous points.

A further object of the present invention is to provide a point sharpness tester which is completely automatic in operation, thereby rendering sharpness evaluations which are completely objective in nature.

A further object is to provide a point sharpness tester wherein sharpness is determined by the depth to width ratio of the test point.

Yet another object of the instant invention is to provide a point sharpness tester which may be used by inspectors in the field.

In furtherance of these and other objects, the principle feature of the present invention is a slotted disc and a sensing head assembly which automatically measure the sharpness of a point by evaluating its depth to width ratio. Another feature is means which signal the user if the sharpness of the point being tested meets predetermined hazardous point conditions. Yet another feature is means for measuring the rigidity of the test point.

The point sharpness tester of the present invention is characterized by a stationary slotted plate and a movable sensing head which senses the depth of penetration of the test point through the slot. The instrument further includes a micrometer scale and spindle for advancing the sensing head toward the point and measuring the depth of penetration of the point from the slot to the sensing head. The sensing head also comprises a microswitch for determining whether the test point is sufficiently rigid to cause a puncture. The sensing head further includes a sensing means, such as a light, which indicates when the sensing head is contacted by the test point.

For a better understanding of the present invention a possible embodiment thereof will now be described with reference to the attached drawing, it being understood that the embodiments shown are merely exemplary and in no way limitative.

BRIEF DESCRIPTION OF THE DRAWING

FIG. 1 is a diagram showing point sharpness as a function of point-tip radius and the included angle of the test point.

FIG. 3 is a perspective view of one embodiment of the present invention.

FIG. 4 is a partially cutaway cross-sectional view of the test instrument of FIG. 3.

DETAILED DESCRIPTION OF DRAWING

Figure 2:
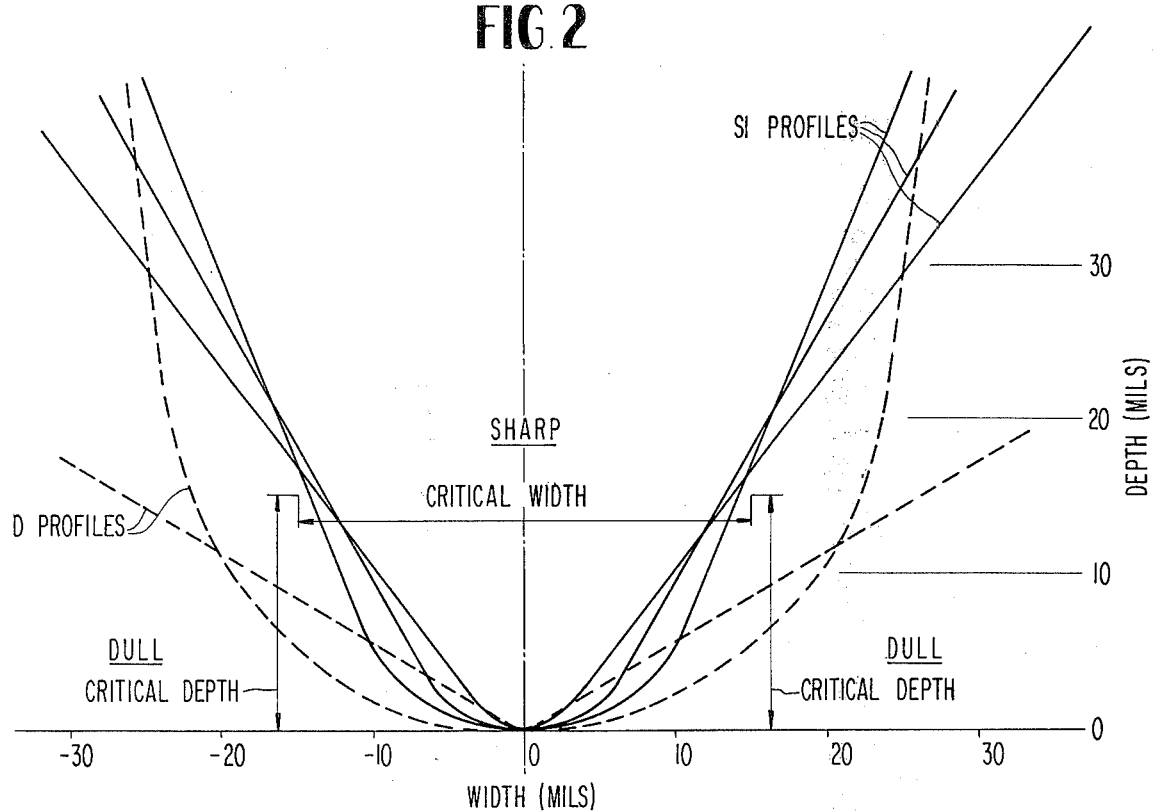
FIG. 2 is a graph showing the depth to width profiles of the sharp-intermediate and dull test points of FIG. 1.

For purposes of describing the principle of the present invention, a point may be defined as a microscopic area forming the connecting surface to three or more macroscopic planes which intersect at a solid interior angle of less than 180°. As the angle of intersection or as the radius of the tip of the point decreases, the tip becomes sharper and requires less force to produce a penetration.

In order to investigate the relationship between the geometry and the sharpness of points, a set of 28 points was manufactured. These points were made from steel rods of ⅛ inch diameter. One end of each of the rods, which were 1½ inches long, was ground to various combinations of angle and tip radii. More particularly, the test points were ground to angles of 15°, 30°, 45°, 60°, 75°, 90°, and 120°. The tip radii employed were 0.002, 0.004, 0.008, 0.012, 0.016, 0.024, and 0.032 inches. Not all combinations of radius and angles were manufactured as preliminary test results indicated that the tips with large angles and radii were not expected to be hazardous.

Referring now to FIG. 1, the points used in the study are shown diagrammatically in terms of both tip radius and angle. This figure forms the basis of the test procedure and sharpness discussion which follows. Fifty men and fity women or various ages and occupations were selected to evaluate the sharpness of the test points indicated schematically in FIG. 1. First, they were instructed to start the test by feeling the duller points first and proceed to the sharper points. Next, they were asked to judge which of the points were sufficiently dull for safe handling and which were definitely too sharp for children's toys. The test points which were judged to be between the definitely sharp and the definitely dull categories were designated intermediate.

As a result of the aforesaid test, the following categories of sharpness were developed.

S-sharp — More than two-thirds of the test subjects considered these points to be definitely hazardous. Less than 10% felt that they were sufficiently dull for safe handling.

SI — sharp intermediate — Between 40% and 70% of the test subjects judged that these points were definitely too sharp. Only 10% to 20% thought that these points were dull.

I-intermediate — Opinions of the test subjects were distributed, 25% of the subjects considered them sharp, 35% considered them dull, and the remainder were undecided.

D-dull — Over two-thirds of the people tested considered these points safe. Less than 10% felt that they were sharp.

The test results were substantially the same for people of different sex, age and occupational groups. Using the above categories of sharpness, tests results for all 100 subjects are summarized in FIG. 1. For convenience, test data are arranged in diagonal rows so that as one moves diagonally upwardly to the right, the points have a smaller (sharper) tip radius; and if one moves diagonally upwardly to the left, the points become smaller (sharper) in angle.

From the consensus of opinion, it appeared that the points of the type designated "S" or "SI" constituted the greatest potential source of injury, and since these points may be delineated as those above by the dotted line in FIG. 1, it seems reasonable to look for factors common to members of this group which would distinguish them from the other test points.

Referring now to FIG. 2, profiles of the SI points and the D points which border on intermediate points are shown. A comparison of these profiles indicates that the greatest distinction between sharp and dull occurs at a depth of 0.015 inches from the tip. At this depth, the SI points are all within 0.030 inches width, the D points are all outside a 0.040 width, and the intermediate points (not shown) can be found somewhere between the two. The above observation can be explained by the fact that skin and its supporting tissue deform somewhat when points are touched. The deformation allows the penetration force to be distributed over the area immediately behind the tip of the point. Therefore, as this area increases, both the sensation of sharpness and the ability to puncture diminish.

On the basis of this experimental evidence obtained through a subjective evaluation of a series of known points, the principle may be deduced that the relative sharpness or dullness of the point can be determined by its geometric configuration alone. As indicated above, the consensus of opinion of the test subjects was that a point should be considered too sharp for safe handling if it extends 0.015 inches with a width no greater than 0.030 inches. Also, it is necessary that the point have sufficient strength and rigidity to maintain its original shape when touched. In this regard, laboratory experiments with points made of wood and plastics indicate that a modulus of elasticity greater than 0.5 times $10^6$ psi is necessary for a point to puncture human skin under conditions of casual contact.

It should be noted that any other suitable procedure for determining the depth to width ratio for hazardous points may be employed. Also, it should be understood that the critical depth to width ratio will vary depending on the material to be punctured.

Referring now to FIGS. 3 and 4, there is shown a point sharpness tester 10 which is capable of measuring the depth to width ratio of a point. The barrel 12 of the instrument is a thin-walled transparent cylinder, e.g., formed of methacrylate plastic or the like, open at both ends. One end 18 of the barrel 12 is externally threaded. A disc 14, having a slot 15, is designed to fit over the opening of the barrel at the threaded end 18. The disc 14 is held in place by an O-shaped cap 16 which is internally threaded so as to mate with the threaded end 18 of the barrel 12. The diameter of the disc 14 is slightly larger than the inner diameter of the barrel 12 but is small enough so as not to interfere with the threads of the cap 16. This construction allows a test point 21 to pass through the center of the cap 16 and the slot 15, and into the interior of the barrel 12.

A sensing head assembly 24 is slidably disposed within the interior of the barrel 12. An inwardly extending flange 20 extends radially into the interior of the barrel 12. The sensing head assembly 24 includes a cylindrical portion 26, having a diameter sustantially equal to the diameter of the opening formed by flange 20, and a flange portion 28, having a diameter substantially equal to the inner diameter of the barrel 12. A spring 22 is positioned about the cylindrical portion 26 between the flange 20 and the flange portion 28. A transparent light housing 30 is removably fastened to the end of member 28 which faces away from the threaded end 18 of the barrel 12.

An O-shaped cap 34 is secured about the unthreaded end of the barrel 12 by screws 36. The center of the O-shaped cap 34 houses a micrometer 40. The spindle 32 of the micrometer 40 extends into the interior of the barrel 12 and contacts the light housing 30. Thus, as the spindle 32 is advanced by rotating the handle of the micrometer 40 the sensing head assembly 24 is advanced toward the disc 14. When the micrometer is backed off the spring 22 keeps the light housing 30 in contact with the spindle 32, thereby biasing the sensing head assembly 24 away from the disc 14. A micrometer scale 38 is used to measure the increment of advancement of the sensing head assembly 24.

A plurality of discs 14' may be provided, each having a slot 15' of a different width. The discs 14' may be easily interchanged with disc 14 by unscrewing the cap 16 and replacing disc 14 with any of the other discs 14'. The slotted openings in the discs permit the testing of points which have an irregular configuration.

Figure 5:
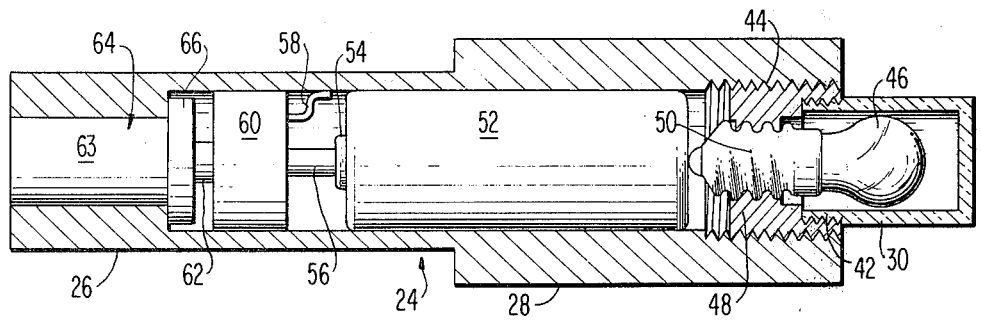
FIG. 5 is a cross-sectional view of the sensing head of the test instrument of FIGS. 3 and 4.

Referring now to FIG. 5 there is shown a detailed drawing of the sensing head assembly 24. A small diameter bore in the cylindrical portion 63 of sensing head assembly 24 houses the narrow portion 63 of the sensing tip 64 which has a T-shaped cross section. The larger portion 66 of the T-shaped sensing tip 64 is housed in a larger diameter bore which communicates with the smaller bore and passes through flange portion 28 of the sensing head assembly 24. Fixedly mounted within the larger bore is a micro-switch 60 including a compression means or a pushbutton contact 62 which contacts the end portion 66 of the sensing tip 64. The microswitch 60 further includes contacts 56 and 58. Contact 56 abuts battery contact 54 of battery 52; while contact 58 is grounded to the interior surface of the sensing head assembly 24. The end of flange portion 28, which is furthest from the cylindrical portion 26, is internally threaded so as to receive a threaded plug member 48. Plug member 48, likewise has a small and a large connecting bore which receive light bulb base 50 and the threaded end 42 of light housing 30. Once the light bulb 46 has been screwed into the threaded member 48, the light housing 30 may be screwed into the threaded plug member 48. The threaded plug member 48 allows the user to adjust the light bulb base 50 to eliminate the lost motion in the micro-switch 60.

In operation, the instrument is first calibrated by advancing the micrometer spindle 32 until the sensing tip 64 contacts the disc 14 and noting the reading on the micrometer scale 38. Next, the micrometer spindle 32 and the sensing head assembly 24 is backed off away from disc 14. After a test point is inserted through slot 15, the spindle 32 and the sensing head assembly 24 are advanced toward the disc 14 and the test point by rotating the micrometer 40. When the test point contacts the tip 64 of the sensing head assembly 24 plus 1 mil travel, which is required to compress the pushbutton 62 of the micro-switch 60, the circuit is completed and the light bulb 46 is illuminated. Furthermore, since a force of approximately 200 grams is required to compress the pushbutton 62 on the micro-switch 60, any test point of insufficient rigidity will not close the circuit and activate light 46. It was found that a point with insufficient rigidity to activate this switch would not cause a puncture in human skin, even if made from an inherently rigid material and cut to a fine point.

Finally, the reading on the micrometer scale 38 is noted and compared with the calibration reading. The difference in the readings plus the thickness of the disc 14 equals the depth of the test point at the moment of contact, which is indicated by the illumination of the light bulb 46. Since the width of the slot 15 is known, the degree of sharpness may be determined by calculating the depth to width ratio of the test point.

Figure 6:
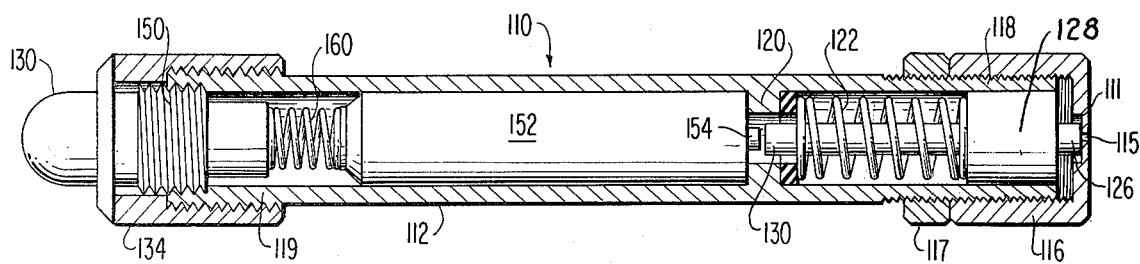
FIG. 6 is a cross-sectional view of an alternative embodiment of the present invention.

Referring now to FIG. 6, an alternate embodiment of the present invention eliminates the necessity of any calculations whatsoever on the part of the user. The point sharpness tester 110 comprises a cylindrical transparent barrel similar to that of the first embodiment. Adjustably screwed on end 118 of barrel 112 is slotted cap 116. A locknut 117 may be used to secure the slotted cap in position. The slotted cap 116 includes a slot 115 of predetermined width. An inwardly extending flange 120 extends radially into the interior of the barrel 112. A sensing head assembly 128 is slidably mounted between the flange 120 and the slotted cap 116. A sensing head contact 130 extends from the sensing head assembly 128 toward a battery 152. A spring 122 is disposed between the flange 120 and the sensing head assembly 128 about the sensing head contact 130. The spring forces the sensing tip 126 into the recessed portion 111 of the slotted cap 116 and into abutment with slot 115.

The contact end of battery 152 abuts the side of flange 120 which faces the threaded end 118 of the barrel 112. A contact gap is, thereby, formed between the battery contact 154 and the sensing head contact 130. The contact gap may be adjusted by adjusting the extend to which slotted cap 116 is screwed onto the threaded end 118 of barrel 112.

A miniature light bulb (not shown) is mounted in the internally threaded portion of end cap 119 of the barrel 112. An internally threaded light cap 134, having a panel indicator dome 130, is screwed onto the externally threaded portion of end 119 of the barrel 112. The base 150 of the miniature light bulb is connected to the battery 152 by a spring 160.

In operation, a slotted cap with the appropriate width slot is selected. Next, the appropriate contact gap must be selected. If the width of the slot, the slot depth, and the critical depth to width ratio are known, the required contact gap may be easily calculated. For example, assume the width of the slot is 0.03 inches, the slot depth is 0.01 inches, and the critical depth to width ratio is 1/2. We also know that the slot depth plus the contact gap equals the depth of penetration of the test point through the slot 115. Therefore, a contact gap of 0.005 inches must be used, since we are to test points for a depth to width ratio of 1/2.

The contact gap is set by advancing slotted cap 116 until contact is made between sensing head 128 and battery terminal 154 which is indicated by the illumination of the minature light, followed by retreating the slotted cap 116 the appropriate number of 0.001 inch incriment marks (not shown) scribed on perimeter of cap 116. When a test point, inserted through the slot 115, extends a greater distance than the 0.015 inches, the circuit will be closed and the light will be illuminated, thereby indicating a hazardous point which has a depth to width ratio greater than 1/2. Furthermore, the spring 122 has a compression load of approximately 200 grams, therefore, any test point of insufficient rigidity will not close the circuit and activate the light. In this regard, it was found that material with insufficient rigidity to compress this spring would not cause a puncture in human skin, even if made from an inherently rigid material and cut to a fine point.

It will be obvious to those skilled in the art that various changes may be made without departing from the scope of the invention and the invention is not to be considered limited to what is shown in the drawings and described in the specification.

What is claimed is:

1. An instrument for testing the degree of sharpness of a point by evaluating its depth to width ratio and rigidity comprising:

a housing of a predetermined thickness having a slot of a predetermined width through which the point to be tested may be inserted;

sensing means within said housing and movable toward and away from said slot for contacting the point and sensing the depth of penetration of the point through said slot, said sensing means including compression means for determining the rigidity of the point by its ability to compress;

signaling means within said housing and connected to said sensing means for indicating when said sensing means comes into contact with the point and the point causes said compression means to compress;

means contacting said sensing means for advancing said sensing means toward and away from said slot and for measuring the depth of penetration of the point from said slot to said sensing means when said signaling means indicates that said sensing means has come into contact with the point and the point has caused said compression means to compress; and means mounted between said housing and said sensing means for biasing said sensing means away from said slot;

wherein the thickness of the point is represented by the width of said slot, the depth of the point is represented by the wall thickness of said housing plus the distance measured from said slot to said sensing means when said signaling means is activated, and the rigidity of the point is represented by the ability of the point to compress said compression means.

2. The device of claim 1, wherein said housing is a transparent hollow cylinder, said transparent hollow cylinder having a substantially planar end surface of predetermined thickness on which said slot is located.

3. The device of claim 2, wherein said planar end surface is removably mounted on said transparent hollow cylinder.

4. The device of claim 3, further comprising a plurality of interchangable planar end surfaces, each having a slot of a different width.

5. The device of claim 1, wherein said sensing means includes a sensing tip movably therein for compressing said compression means when said sensing tip is contacted by a sufficiently rigid point.

6. The device of claim 1, wherein said compression means is a pushbutton micro-switch.

7. The device of claim 1, wherein said signaling means includes a source of electrical potential connected to said compression means and a light bulb connected to said source of electrical potential, whereby the activation of said compression means closes the circuit formed by it and said source of electrical potential and said light bulb.

8. The device of claim 1, wherein said means for advancing said sensing means toward said slot and for measuring the depth of penetration of the point is a micrometer spindle and scale, respectively.

9. The device of claim 1, wherein said means for advancing said sensing means away from said slot is a spring.

10. An instrument for testing the degree of sharpness of a point by evaluating its depth to width ratio and rigidity comprising:

a housing of predetermined thickness having a slot of a predetermined width through which the point may be inserted;

sensing means within said housing and movable toward and away from said slot for contacting the point and sensing the depth of penetration of the point through said slot;

compression means mounted between said housing and said sensing means for determining the rigidity of the point by said points ability to compress said compression, said compression means constantly urging said sensing means toward said slot; and signaling means in said housing for indicating when the point extends through said slot a predetermined distance; and when said point has compressed said compression means a predetermined amount wherein the thickness of the point is represented by the width of said slot, the depth of the point is represented by the wall thickness of said housing plus said predetermined distance, and the rigidity of the point is represented by its ability to compress said compression means.

11. The device of claim 10, wherein said housing is a transparent hollow cylinder, said transparent hollow cylinder having a substantially planar end surface of predetermined thickness on which said slot is located.

12. The device of claim 11, wherein said planar end surface is removably mounted on said transparent hollow cylinder.

13. The device of claim 10, wherein said compression means is a spring.

14. The device of claim 10, wherein said signaling means includes a source of electrical potential contactable by said sensing means when the point extends through said slot said predetermined distance and a light bulb connected to said source of electrical potential, whereby the contacting of said electrical potential source by said sensing means.

15. The device of claim 14, further comprising a plurality of interchangable planar end surfaces, each having a slot of a different width.

* * * * *